May 22, 1951         P. LUCAS        2,553,925
METHOD AND INSTALLATION FOR APPLYING METAL TO
AT LEAST ONE METALLIC PART
Filed July 24, 1946
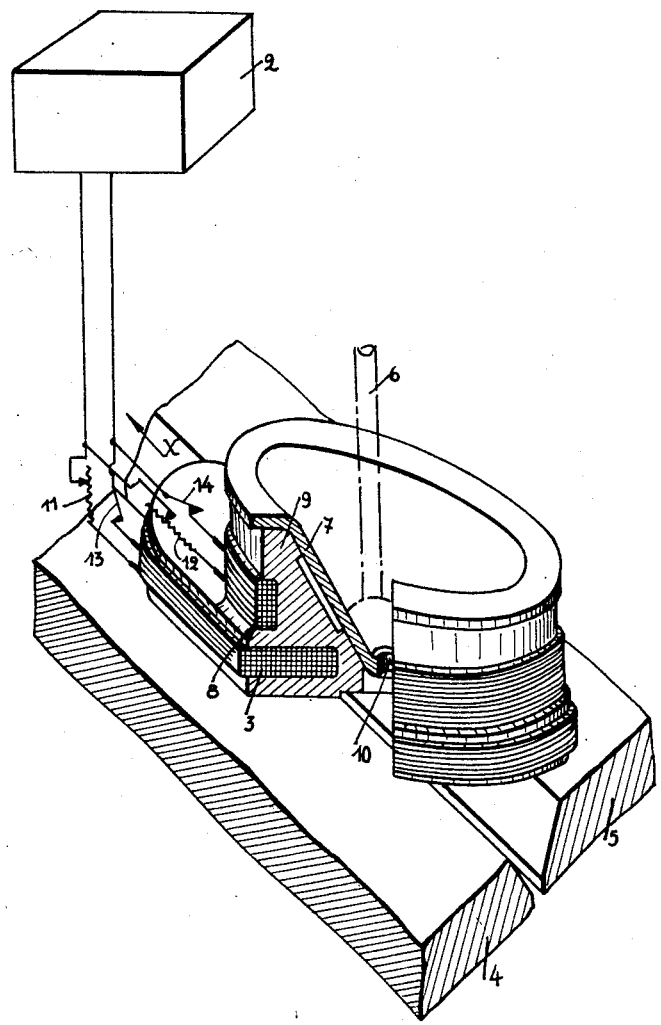
INVENTOR
PAUL LUCAS
BY Young, Emery & Thompson
ATTYS- Patented May 22, 1951

2,553,925

UNITED STATES PATENT OFFICE 2,553,925

METHOD AND INSTALLATION FOR APPLYING METAL TO AT LEAST ONE METALLIC PART

Paul Lucas, Charleroi, Belgium, assignor to Societe Anonyme Electromecanique, Brussels, Belgium Application July 24, 1946, Serial No. 685,952
In Belgium November 6, 1945

1 Claim. (Cl. 219—10)

The present invention relates to a method of applying metal to at least one metallic work, hereinafter designated "the base metal" by thermal welding of the added metal to the base metal, in which these metals are heated electrically.

In all known methods of thermal welding or of thermal consolidation of metallic works with added metal, the source of heat is external to the works to be assembled or to be built up and to the added metal.

In particular, in the case of electric arc welding, the added metal and the base metal are heated by the arc which is formed between them and which dissipates a part of the electric energy supplied, in the form of radiant heat and in the form of light energy.

The present invention aims at a more economic method by means of which the electrical energy which is supplied is transformed into heat energy within the added metal and the base metal almost exclusively where the added metal is to be melted and where the base metal is to be heated or melted in order to ensure good welding.

To this effect, in the method in accordance with the invention, the added metal and the base metal are simultaneously subjected to an alternating electromagnetic field having a frequency of at least 500 cycles per second, inducing in these metals Foucault currents, which carry them simultaneously to the temperature required for their welding.

In practice, the alternating magnetic field capable of causing the added metal which is introduced into it to melt and of carrying the base metal to the temperature required for its welding to the added metal which falls into contact with it can easily be created by causing an alternating current to circulate in a conductor placed near the base metal, this conductor being constituted preferably as a coil having its axis at right angles to the face of the works to be welded.

As is known, the heat generated by Foucault currents which arise within a metallic work subjected to the electro-magnetic field created by an alternating current circulating in a coil increases in accordance with the square root of the product of the frequency by the cube of the number of effective ampere-turns per centimetre of length of the coil.

In order to avoid the use of an excessively intense current in the coil generating the electromagnetic field, it is therefore advantageous to increase the frequency of the input current to generate the heat required by the welding or the consolidation. On the other hand, in order to reduce the cost of the alternating current generator, it is advantageous not to use too high a frequency.

For these reasons, in accordance with the invention, the use of an alternating electromagnetic field having a frequency between 25,000 and 50,000 cycles per second is envisaged.

In order to facilitate the obtaining of the required temperature for the base metal when the molten added metal is in contact with it, in accordance with the invention, the base metal is subjected to an alternating electromagnetic field before the added metal is subjected to such a field, and the base metal and the added metal are then subjected to such a field until the welding has been effected. In this way, the mass of base metal, which is greater than that of the added metal, can be carried in good time to the required temperature without making it necessary to use a much more intense electromagnetic field than that which is necessary for effecting fusion of the added metal.

The method according to the invention can be advantageously completed by a pre-heating of the base metal and/or an after-heating of this metal and of the added metal after the welding of the consolidation has been carried out.

This pre-heating and this after-heating can be easily carried out by adapting either the intensity of the electromagnetic field or the frequency of this field to the thermal conditions which are to be set up. If desired, these factors can be carried during the pre-heating or the after-heating, in order to ensure the desired temperature variation in the base metal, either before or after the welding or consolidation.

The invention also has as an object, an installation suitable for carrying out the method according to the invention.

The installation according to the invention comprises an alternating current generator having a frequency above 500 cycles per second, feeding a conductor which can be placed near a metallic work which is to receive added metal brought near this conductor.

Preferably, the above-mentioned conductor is in the form of a coil into the central part of which the added metal can be brought.

In one advantageous embodiment, the above-mentioned coil surrounds a crucible which is to receive the added metal and other products used in the deposition of this metal.

Other features and details of the invention will be made clear in the course of the description of the drawing attached to the present specification which shows diagrammatically in perspective and in partial section one embodiment of the installation in accordance with the invention.

This drawing shows an alternating current generator 2, the frequency of which is, for example, 50,000 cycles per second. This generator feeds a coil 3 which is to be placed near two metal works 4 and 5 to be welded together. Having regard to their thickness, these parts 4 and 5 which will sometimes be referred to hereinafter as "the base metal" have been shaped so that their lips opposite each other form, in a manner known in itself, a V in which the added metal is to be deposited. This added metal is brought, in the usual way, in the form of a rod 6 shown in chain-dotted lines and is introduced into a crucible 7, surrounded by the coil 3, as well as by another coil 8 likewise fed by the generator 2.

The high frequency current circulating in these coils has the effect of creating in the metal rod 6 Foucault currents which generate heat within the metal.

By creating a sufficiently intense electromagnetic field by choosing the intensity of the current, the frequency and the number of effective ampere-turns per centimetre of length of the coil, the added metal 6 can be caused to be melted. The crucible 7 in which this metal melts is separated from the coils 3 and 8 which surround it by a thermally insulating layer 9.

In the crucible 7 other substances which are to form for example a slag or flux or to confer certain special mechanical or chemical properties on the welded seam can also be melted in contact with the molten metal coming from the rod 6.

The metal and the other molten substances in the crucible 7 can flow out of the crucible by gravity through an orifice 10 formed in the lower part. This crucible is displaced above the V-joint formed between the works 4 and 5 during the welding operation.

The coil 3 which is disposed very near the parts 4 and 5 generates an electromagnetic field which penetrates superficially into the lips of the V and gives rise therein to Foucault currents generating enough heat to carry to the required temperature that part of the works 4 and 5 which is to receive the added metal.

Theoretically, a single coil can be used instead of the two coils 3 and 8. This coil can be made and fed in such a way that it causes the added metal brought into its central part to be melted and that it carries the base metal to the required temperature.

The adjustment of the temperature of the base metal can be effected by varying the distance between the coil in question and the base metal. By disposing the coil very near the base metal, it is very easy to cause the base metal to melt superficially in the case in which the part which is to receive the added metal is to be melted.

In the case in which the added metal has not the same composition as the base metal, this added metal is generally more fusible than the base metal and, in that case, it is sufficient to bring the base metal to an adequate temperature which nevertheless is substantially below its fusion temperature.

When welding is to be carried out along a long joint by means of the method according to the invention, either the coils 3 and 8 can be displaced along this joint or the works 4 and 5 can be displaced parallel to the joint beneath the stationary coils. If the coils are moved, in order that the base metal may be brought to the required temperature when the added metal comes into contact with it, the coil 3 is given a greater surface area than the coil 8 and provision is also made that the part of the base metal which is covered by the coil 3 without being covered by the coil 8 is situated in front relatively to the direction of movement of the two coils 3 and 8 along the joint to be welded.

In the case shown in the drawing, the coil 3, which has a larger surface area, is of elongated shape while the coil 8, which has a smaller surface area, is of circular shape. The crucible 7 is, moreover, placed at one of the ends of the elongated coil 3. The part of the latter which is not covered by the crucible is situated in front of the latter in the direction of displacement X of the coils 3 and 8 along the joint between the works 4 and 5. If these works were displaced beneath the stationary coils 3 and 8, this displacement would, of course, have to be in the direction opposite to that of the arrow X for the position of the coils shown in the drawing.

The coils 3 and 8 being supplied by means of the same generator 2, the current which passes through them can be adjusted separately for each one of them by adjusting, for example, a variable resistance. The variable resistance which is in series with the coil 3 is designated 11 while that in series with the coil 8 is designated 12. A switch allows each of the coils to be disconnected separately. These switches are designated 13 and 14.

The resistance 11 can be used not only for causing variation of the temperature of the base metal, but also for regulating, if desired, the preheating of the base metal and the after-heating of the base metal which has received the added metal, by means of an alternating current supplied by the generator 2.

As has already been pointed out above, the amount of heat generated in the base metal and the added metal is a function of the frequency of the alternating current which gives rise to the electromagnetic field.

Although it is advantageous to use medium and high frequency currents, it is preferable to use a current having a frequency between 25,000 and 50,000 cycles per second. With currents of this frequency, the base metal and the added metal can be easily heated without the use of an excessively high current and without the use of generators of excessively costly construction.

If it is assumed, for example, that a coil having a single spiral of a height of one centimetre, a thickness of two centimetres and an external diameter of 2½ centimetres is placed on steel base metal and that this coil is supplied with alternating current at a frequency of 50,000 cycles per secnod, and having an intensity of 1,000 amperes, it can be calculated that the amount of heat developed by the Foucault currents in the base metal is, in the cold state, 18,328 watts per square centimetre, and in, the hot state, 1,382 watts per square centimetre, while the heat developed by the Foucault currents in the end of a steel rod 6 is, in the cold state, 8,250 watts and, in the hot state, 294 watts. It can also be calculated that 500.2 watts suffice to maintain molten a small superficial zone of the base metal measuring 1 square centimetre. This metal can therefore, indeed, be brought very rapidly to the temperature corresponding to the magnetic loss and can be very easily brought to and maintained in the molten state.

The speed of fusion of the added metal depends among other things upon the intensity and the frequency of the input current to the coils 3 and 8. The speed of fusion can be adjusted at will, as far as the added metal is concerned, by adjustment of the intensity of the current supplied by the generator and by adjustment of the frequency of this current or by adjustment of only one of these two variables in the input circuit.

The speed at which the base metal is heated and the depth of the superficial zone of this metal which is subjected to this heating depends upon the same variables and also upon the distance which separates the lower part of the coil 3 from the base metal. The speed of heating of the base metal and the depth of the superficial zone which corresponds to this heating can, therefore, be adjusted at will, by adjustment of the intensity of the current supplied by the generator, by adjustment of the frequency of this current and by adjustment of the distance between the coil 3 and the base metal or by adjustment of at least one of these variables.

Welding, and if desired, consolidation, by the method according to the invention can be carried out manually, semi-automatically or automatically according as the displacement of the coils 3 and 8, the supply of the added metal, of the slag, of the flux or of other addition products into the magnetic field, the supply of products which are to form a slag or flux on the base metal as well as the removal of any possible excess of these products after welding, are manual, semi-automatic, or automatic.

The pre-heating and after-heating operations can also be manual, semi-automatic or automatic.

Instead of one or more coils such as 3 and 8, a conductor in another form placed on the base metal and causing the melting of the added metal which is deposited in the V between the works 4 and 5 can likewise be used for carrying out the process according to the invention this conductor being displaced along the joint as and when the metal deposited in the joints is melted.

The method in accordance with the invention is not dangerous for the operator and, in carrying it out, it is not required that there should be any difference of potential between the heating apparatus and the works to be heated.

It is clear that the invention is not exclusively limited to the embodiment shown and that many modifications can be made to the form, disposition and constitution of certain of the elements for realizing the invention without exceeding the scope of the present patent as long as these modifications are not in contradiction with the object of the following claims.

What I claim is:

A method of welding metallic pieces by adding melted metal in the joint between metallic pieces to be welded, maintained at a fixed distance from each other, comprising heating by high frequency induction currents a local portion of the lips of said joint to the temperature required for its welding with the added melted metal, melting above said local portion the welding metal to be added, by high frequency induction currents of the same frequency as those used for heating the lips to be welded at said local portion, allowing said melted welding metal to fall on said local portion of the lips, and moving the heating means of the pieces to be welded and of the welding metal along said joint.

LUCAS, PAUL.

REFERENCES CITED

The following references are of record in the file of this patent:

UNITED STATES PATENTS

| Number | Name | Date |
|---|---|---|
| 1,726,431 | Fourment | Aug. 27, 1929 |
| 1,754,382 | Baracate | Apr. 15, 1930 |
| 1,803,500 | Fagan | May 5, 1931 |
| 1,823,873 | Brace | Sept. 22, 1931 |
| 1,879,409 | Morris | Sept. 27, 1932 |
| 1,998,496 | Fiedler | Apr. 23, 1935 |
| 2,024,906 | Bennett | Dec. 17, 1935 |
| 2,205,424 | Leonard | June 25, 1940 |
| 2,217,546 | Hagedorn | Oct. 8, 1940 |
| 2,222,977 | Jones | Nov. 26, 1940 |
| 2,249,909 | Pisarev | July 22, 1941 |
| 2,290,338 | Koehring | July 21, 1942 |
| 2,365,958 | Holslag | Dec. 26, 1944 |